April 26, 1938. R. W. CLEMMONS 2,115,481
REEL
Filed March 29, 1937  2 Sheets-Sheet 1

Inventor:
Ralph W. Clemmons,
By Dyrenforth, Lee, Chritton and Wiles,
Attys.

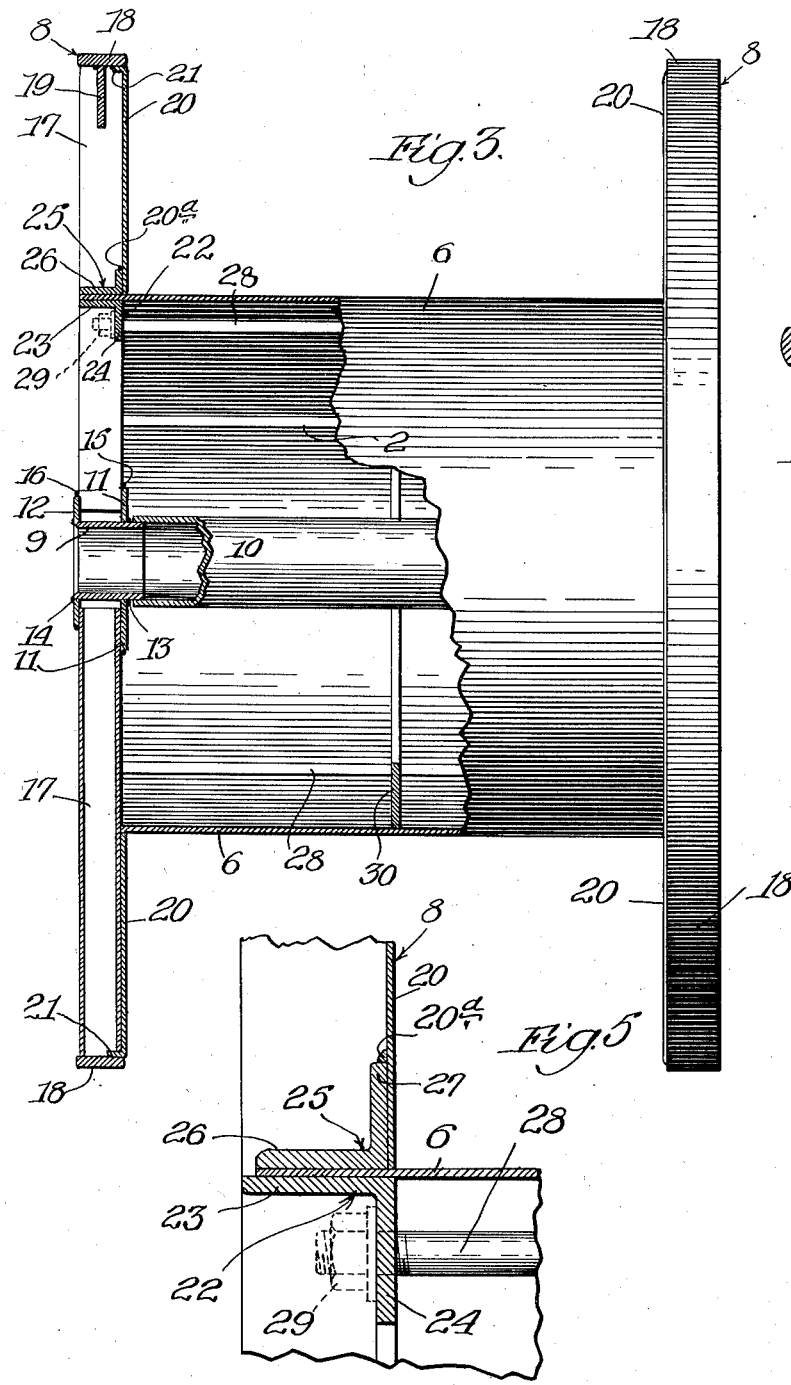
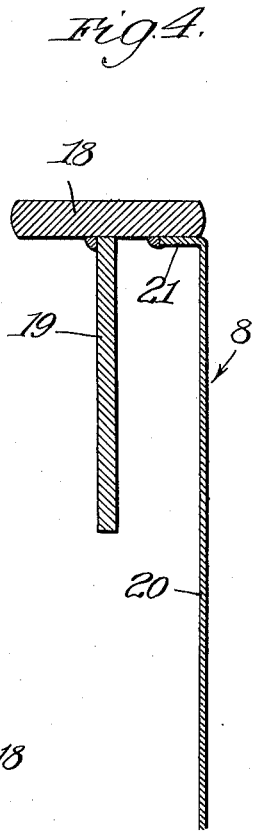

Patented Apr. 26, 1938

2,115,481

UNITED STATES PATENT OFFICE 2,115,481

REEL

Ralph W. Clemmons, Chicago, Ill., assignor to R. B. Hayward Company, a corporation of Illinois Application March 29, 1937, Serial No. 133,737

3 Claims. (Cl. 242—77)

My invention relates to metal reels provided, for example, for the winding thereon of electric cables, or the like.

Certain of my objects are to provide improvements in reels to the end of simplifying the construction thereof, reducing the cost of manufacture and, by an inexpensive construction, minimizing possibility of denting of the hub portion of the reel; and other objects as will be manifest from the following description:

Referring to the accompanying drawings:

Figure 3 is a view in side elevation, partly sectional, of the reel shown in Fig. 1, this view being taken along the irregular line 3—3 on Fig. 1 and viewed in the direction of the arrows.

Figure 4 is an enlarged fragmentary sectional view taken at the line 4 on Fig. 1 and viewed in the direction of the arrows; and Figure 5, an enlarged fragmentary sectional view taken at the line 5 on Fig. 1 and viewed in the direction of the arrow.

Figure 1:
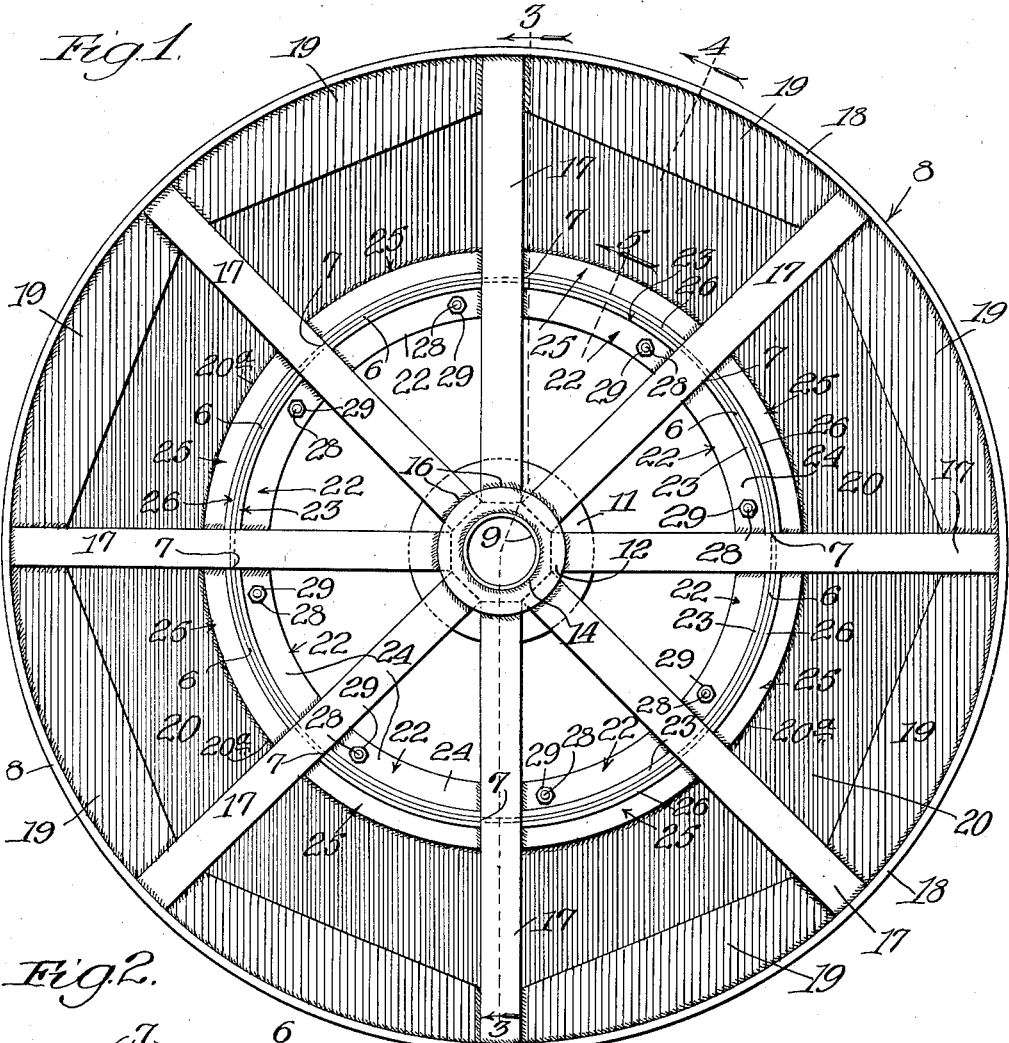
Figure 1 is a view in end elevation of a reel constructed in accordance with my invention.
Figure 2:
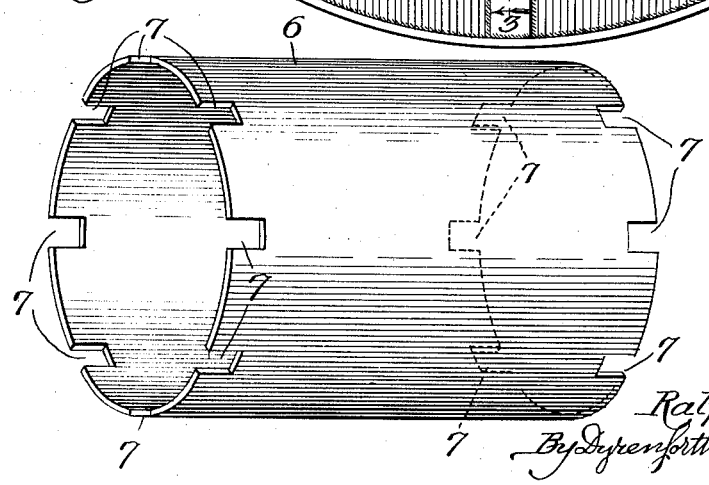
Figure 2 is a perspective view of a shell forming the hub portion of the reel.

Referring to the particular illustrated embodiment of my invention, the reel shown comprises a hub portion 6 shown as formed of a cylindrical drum of sheet metal provided at each end with a series of equidistantly spaced notches 7 at which the drum is adapted to straddle the radial spokes of the heads of the reel as hereinafter described. The heads referred to and represented generally at 8, each comprises a centrally located arbor tube 9 telescoping, and connected with, the opposite ends of a tube 10 extending lengthwise through the center of the hub portion 6. Each arbor tube 9 is surrounded by spaced apart rings 11 and 12 secured thereto as for example by continuously welding them to the tube as represented at 13 and 14, respectively.

Radiating from the arbor tube 9 and welded to the rings 11 and 12, as indicated at 15 and 16, respectively, are spokes 17 shown as of hollow sheet metal construction of substantially square shape in cross section.

Each head also comprises a tread section 18 shown as in the form of a continuous plain circular band rigidly secured, as for example by welding, to the outer ends of the spokes 17.

Between adjacent spokes and secured at their ends to the spokes, are plate-like gusset-members 19 shown as located substantially midway between the lateral edges of the tread 18. The outer edges of these gusset members conformingly fit against the inner periphery of the tread member 18 to which they are secured as by welding them thereto, the ends of the gusset members being welded to the sides of the adjacent spokes 17.

Each head is also shown as provided with a side-plate-forming member or sheath 20 located at the inner face of the head and surrounding the drum. The outer periphery of the sheath 20 is provided with a continuous flange as represented at 21 which laps the inner periphery of the tread member 18 and to which it is secured, the outer ends of the spokes being notched to receive this flange.

Each head 8 is provided with bearing means for the ends of the drum 6 for holding the drum in the desired position concentric with the heads. These bearing means in the construction shown comprise a circular series of arcuate angle irons 22 located in the several spaces between the spokes 17 and each secured at its opposite ends, as for example by welding, to the sides of the adjacent spokes 17. One flange 23 of each of the angle irons 22 is disposed concentric with the drum 6, its other flange 24 being located at the inner face of the head and extending toward the longitudinal axis of the reel. The angle members 22 thus present an interrupted annular bearing surface of a diameter substantially that of the internal diameter of the drum which fits over this annular bearing surface.

Preferably, and as shown, there is provided, for cooperation with the members 22 in the holding of the ends of the drum 6 against distortion, a circular series of arcuate members 25 also shown as formed of angle bars which surround the outer periphery of the drum 6 at its ends, the members 25 being located in the several spaces between the spokes 17 to which they are connected at their ends, as for example, by welding them thereto. One flange 26 of each of the members 25 is disposed circumferentially of the drum and between it and the corresponding flanges 23 of the members 22 forms arcuate shaped spaces to receive the end portions of the drum which extend outwardly beyond the inner faces of the spokes. The other flange 27 of each member 25 extends radially outwardly at the inner face of the head and presents a surface to which the sheath 20 may be flatwise secured, as for example by welding it thereto as indicated at 20ᵃ.

The reel also comprises means for connecting the hub portion and heads together in the assembled position shown in the drawings, these means comprising an annular series of tie rods 28 extending through the drum, lengthwise of the latter. These rods extend through openings in the flanges 24 of each of the angles 22 and are provided with nuts 29 which, upon being tightened, serve to draw the heads 8 toward each other, along the drum 6 to rigidly secure these several parts together, the bottom walls of the notches 7 operating as stops engaging the sides of the spokes upon tightening the tie rods 28.

In practice the heads may be formed complete, before assembly with the drum 6, the radial spacing of the members 22 and 25 affording arcuate spaces therebetween adapted to receive the end portions of the drum extending outwardly beyond the end walls of the notches 7.

As will be understood, the provision of the drum in the form shown makes for simplicity of manufacture inasmuch as it may be made from a plain sheet of metal notched out for the spokes as described. This permits of the use of high carbon steel particularly desired as there is little likelihood of the same becoming dented in use.

The drum is shown as provided with a centrally disposed annular band 30 welded at its outer periphery to the inner surface of the drum, this being a desirable, though not an essential, feature of the construction, especially where the reels are to be shipped in knocked down condition.

While I have illustrated and described a particular construction embodying my invention, I do not wish to be understood as intending to limit it thereto, as the same may be variously modified and altered without departing from the spirit of the invention.

What I claim as new, and desire to secure by Letters Patent, is:

1. A reel comprising spaced apart heads, a central hub portion, said hub portion being in the form of a drum having alternate notches and projections in its opposite ends, said heads comprising radial spokes located in said notches and bearing members on said heads for said projections comprising an annular series of arcuate angle bars secured at opposite ends to the spokes located between adjacent spokes and extending into the ends of said drum and an angular series of arcuate angle bars secured at opposite ends to the spokes located between adjacent spokes and radially outwardly spaced from said first-named angle bars and surrounding the said projections, and means connecting said heads and hub portion together.

2. A reel comprising spaced apart heads, a central hub portion, said hub portion being in the form of a drum having a series of notches in its opposite ends, said heads comprising radial spokes located in said notches, and annular series of arcuate angle bars located in the spaces between said spokes and secured to the latter, one flange of each of said bars extending toward the central longitudinal axis of the reel, other annular series of arcuate angle bars located in the spaces between said spokes and secured thereto and radially outwardly spaced from said first referred to angle bars, the ends of said drum extending into the spaces between said series of bars, and tie rods engaging the inwardly extending flanges of said first referred to series of bars for holding said heads and hub portion together.

3. A reel comprising spaced apart heads, a central hub portion in the form of a drum having alternate notches and projections in its opposite ends, said heads comprising radial spokes located in said notches, an annular series of arcuate bars located in the spaces between said spokes and secured to the latter, the said projections extending into the spaces between said series of bars, the bars being in telescoped and supporting relation with the drum, and fastening means for holding the heads and hub portion together, said fastening means being located inwardly of the periphery of the drum and connected to said bars.

RALPH W. CLEMMONS.